US011918165B2

(12) United States Patent
Gross Berry et al.

(10) Patent No.: US 11,918,165 B2
(45) Date of Patent: Mar. 5, 2024

(54) APPLIANCE CONTROL PANEL WITH LIGHT DIFFUSION FEATURES

(71) Applicant: Haier US Appliance Solutions, Inc., Wilmington, DE (US)

(72) Inventors: Michelle Diana Gross Berry, Louisville, KY (US); Kyle James Brewer, Louisville, KY (US); Brian J. Morman, Louisville, KY (US); Timothy David Kaiser, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/742,616

(22) Filed: May 12, 2022

(65) Prior Publication Data

US 2023/0363617 A1 Nov. 16, 2023

(51) Int. Cl.

*A47L 15/42* (2006.01)
*F21V 3/00* (2015.01)
*F21V 7/00* (2006.01)
*F21Y 115/10* (2016.01)

(52) U.S. Cl.

CPC ........ *A47L 15/4293* (2013.01); *A47L 15/4257* (2013.01); *A47L 15/4274* (2013.01); *F21V 3/00* (2013.01); *F21V 7/0008* (2013.01); *F21Y 2115/10* (2016.08)

(58) Field of Classification Search

CPC ......... A47L 15/4257–4293; F21V 3/00; F21V 7/0008; F21Y 2115/10

See application file for complete search history.

(56) References Cited

U.S. PATENT DOCUMENTS

| | | | |
|---|---|---|---|
| 9,220,394 B2 | 12/2015 | Heater et al. | |
| 9,464,781 B1 * | 10/2016 | Bach | F24C 7/083 |
| 9,683,731 B2 * | 6/2017 | Kim | A47L 15/4274 |
| 10,921,048 B2 * | 2/2021 | Kim | F25D 23/02 |
| 2016/0178160 A1 | 6/2016 | Ebrorn et al. | |

FOREIGN PATENT DOCUMENTS

| | | |
|---|---|---|
| JP | 2012061150 A | 3/2012 |
| KR | 101171546 B1 | 8/2012 |
| KR | 102047847 B1 | 11/2019 |

* cited by examiner

*Primary Examiner* — Jason M Han

(74) *Attorney, Agent, or Firm* — Dority & Manning, P.A.

(57) ABSTRACT

A door for an appliance includes a control panel mounted on the door and defining an illumination direction. The control panel includes a printed circuit board defining a top surface, a light source mounted to the top surface of the printed circuit board, a control cover mounted to the top surface of the printed circuit board over the light source and defining a light directing channel extending from a bottom surface of the control cover to a top surface of the control cover, and wherein the control cover further defines a reflective surface for redirecting the light generated by the light source toward the top surface of the control cover, and an overlay panel mounted on the top surface of the control cover, the overlay panel comprising one or more diffused indicator zones.

20 Claims, 5 Drawing Sheets

APPLIANCE CONTROL PANEL WITH LIGHT DIFFUSION FEATURES

FIELD OF THE INVENTION

The present subject matter relates generally to control panels for appliances, and more particularly to door-mounted control panels including features for improved light diffusion for illuminating status indicators.

BACKGROUND OF THE INVENTION

Appliances frequently include doors for closing, insulating, concealing, or otherwise providing selective access to cavities or chambers of the appliance. These doors typically include an inner and outer door that are separated by an air gap which may be filled with fiberglass or insulating foam, e.g., for thermal insulation, sound dampening, etc. In order to provide a user with information regarding the appliance operation, e.g., such as a status of an operating cycle or an indication that a cycle is complete, status indicators are often positioned on the outer door of the appliance such that they are visible to a user of the appliance. In addition, or alternatively, appliances such as dishwasher appliance may include control panels that are integrated into the top of the dishwasher door, e.g., to minimize features on the outer door and provide a clean look.

Notably, however, dishwasher doors have limited space within which the desired electronics associated with user interface or control panels may be mounted. For example, certain conventional control panels include a printed circuit board that is positioned directly below the top surface of the control panel and light sources that are mounted on top of the printed circuit board below illumination zones to light up those zones. However, the short distance between the light sources on the printed circuit board and the indicator zones or surfaces that they illuminate may provide for poor diffusion of the light, resulting in harsh visual representation to the consumer.

Accordingly, an appliance having an improved door and lighting assemblies would be useful. More specifically, a control panel for an appliance having a compact design that provides uniform illumination of status indicators would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment, a control panel for an appliance is provided. The control panel defines an illumination direction and includes a printed circuit board defining a top surface, a light source mounted to the top surface of the printed circuit board for selectively generating light; a control cover mounted to the top surface of the printed circuit board over the light source, the control cover defining a light directing channel extending from a bottom surface of the control cover to a top surface of the control cover, wherein the light source is positioned in the light directing channel proximate the bottom surface of the control cover, and wherein the control cover further defines a reflective surface for redirecting the light generated by the light source toward the top surface of the control cover, and an overlay panel mounted on the top surface of the control cover, the overlay panel comprising one or more diffused indicator zones.

In another exemplary embodiment, a dishwasher appliance defining a vertical direction, a lateral direction, and a transverse direction is provided. The dishwasher appliance includes a wash tub positioned within a cabinet and defining a wash chamber, a door pivotally mounted to the cabinet to provide selective access to the wash chamber, and a control panel mounted on the door and defining an illumination direction. The control panel includes a printed circuit board defining a top surface, a light source mounted to the top surface of the printed circuit board for selectively generating light, a control cover mounted to the top surface of the printed circuit board over the light source, the control cover defining a light directing channel extending from a bottom surface of the control cover to a top surface of the control cover, wherein the light source is positioned in the light directing channel proximate the bottom surface of the control cover, and wherein the control cover further defines a reflective surface for redirecting the light generated by the light source toward the top surface of the control cover, and an overlay panel mounted on the top surface of the control cover, the overlay panel comprising one or more diffused indicator zones.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
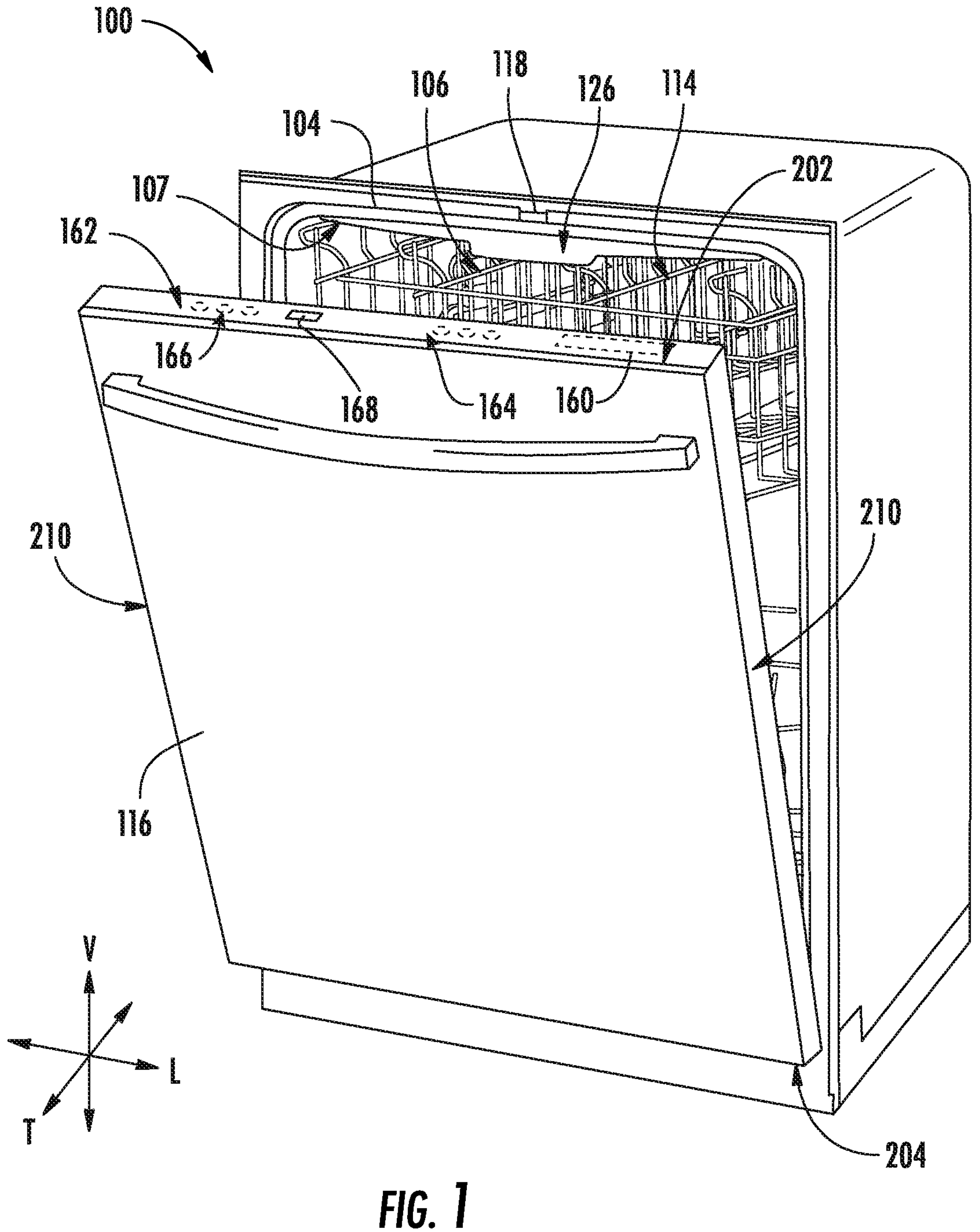
FIG. 1 provides a perspective view of a dishwasher appliance, including a dishwasher door according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the term "or" is generally intended to be inclusive (i.e., "A or B" is intended to mean "A or B or both"). Furthermore, as used herein, terms of approximation, such as "approximately," "substantially," or "about," refer to being within a ten percent margin of error.

Figure 2:
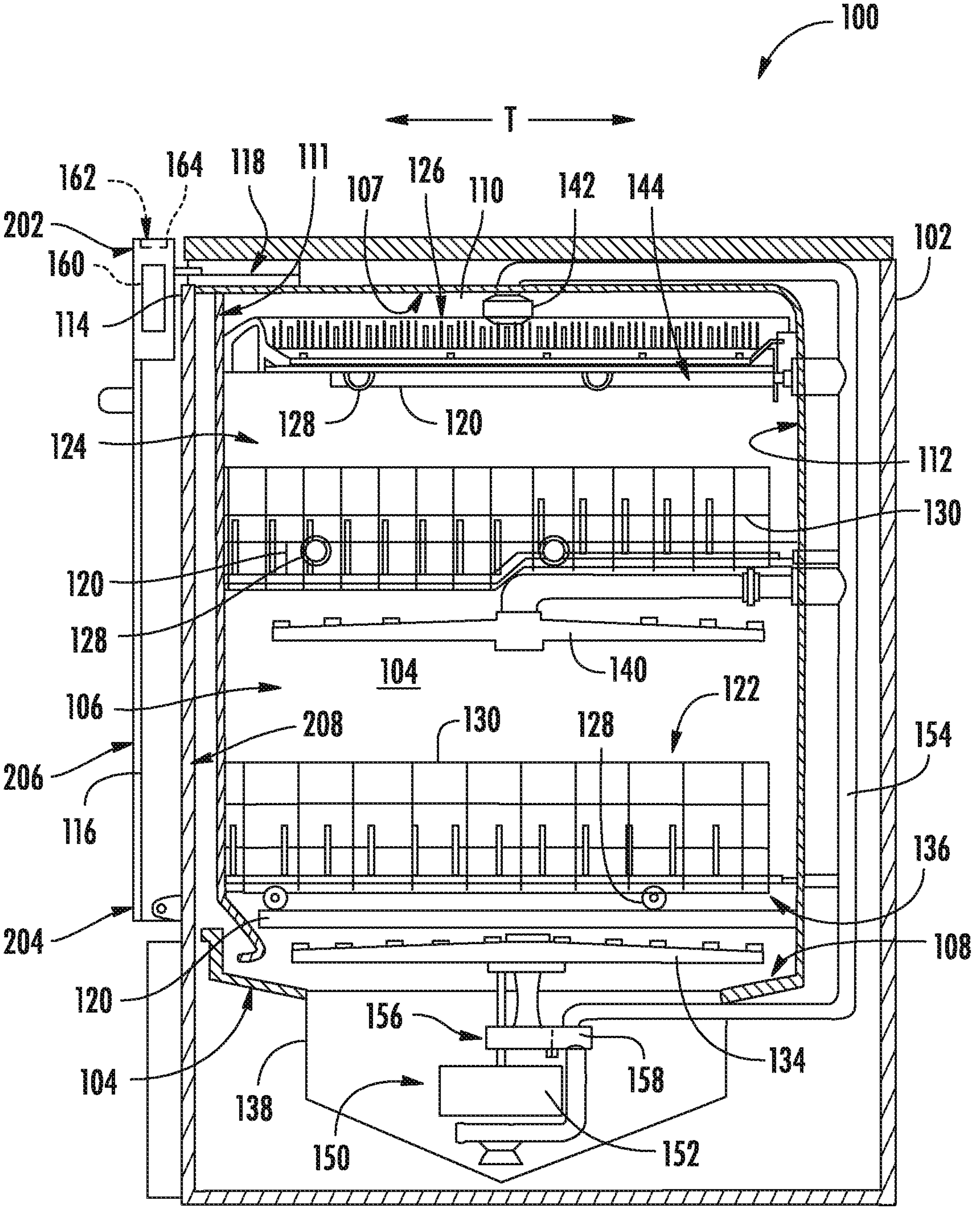
FIG. 2 provides a cross-sectional side view of the exemplary dishwashing appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As illustrated in FIG. 2, tub side walls 110 may accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another exemplary embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies (e.g., to mid-level spray arm assembly 140 and upper spray assembly 142). However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156 (e.g., which may be positioned within sump 138 of dishwasher appliance 100). Diverter assembly 156 may include a diverter disk (not shown) disposed within a diverter chamber 158 for selectively distributing the wash fluid to the spray arm assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154).

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter. Moreover, aspects of the present subject matter may be applied to other appliances as well, such as refrigerators, ovens, microwaves, etc.

Referring now generally to FIGS. 3 through 7, a door assembly 200 will be described according to exemplary embodiments of the present subject matter. For example, door assembly 200 may be used as door 116 of dishwashing appliance 100. Alternatively, door assembly 200 may be used on any other suitable residential or commercial appliance. As described herein, door assembly 200 may share a coordinate system with dishwashing appliance 100, e.g., when door assembly 200 is in the closed position (e.g., as shown in FIG. 2). Specifically, door assembly 200 may define a vertical direction V, a lateral direction L, and a transverse direction T. Therefore, these directions may be used herein to refer to features of door assembly 200 and its various components and sub-assemblies. Referring briefly again to FIGS. 1 and 2, in the normally closed position, door assembly 200 (illustrated for example as door 116) extends from a top end or top edge 202 to a bottom end or bottom edge 204 along the vertical direction V; from a front end 206 to a rear end 208 along the transverse direction T; and between two lateral ends 210 along the lateral direction L.

Figure 3:
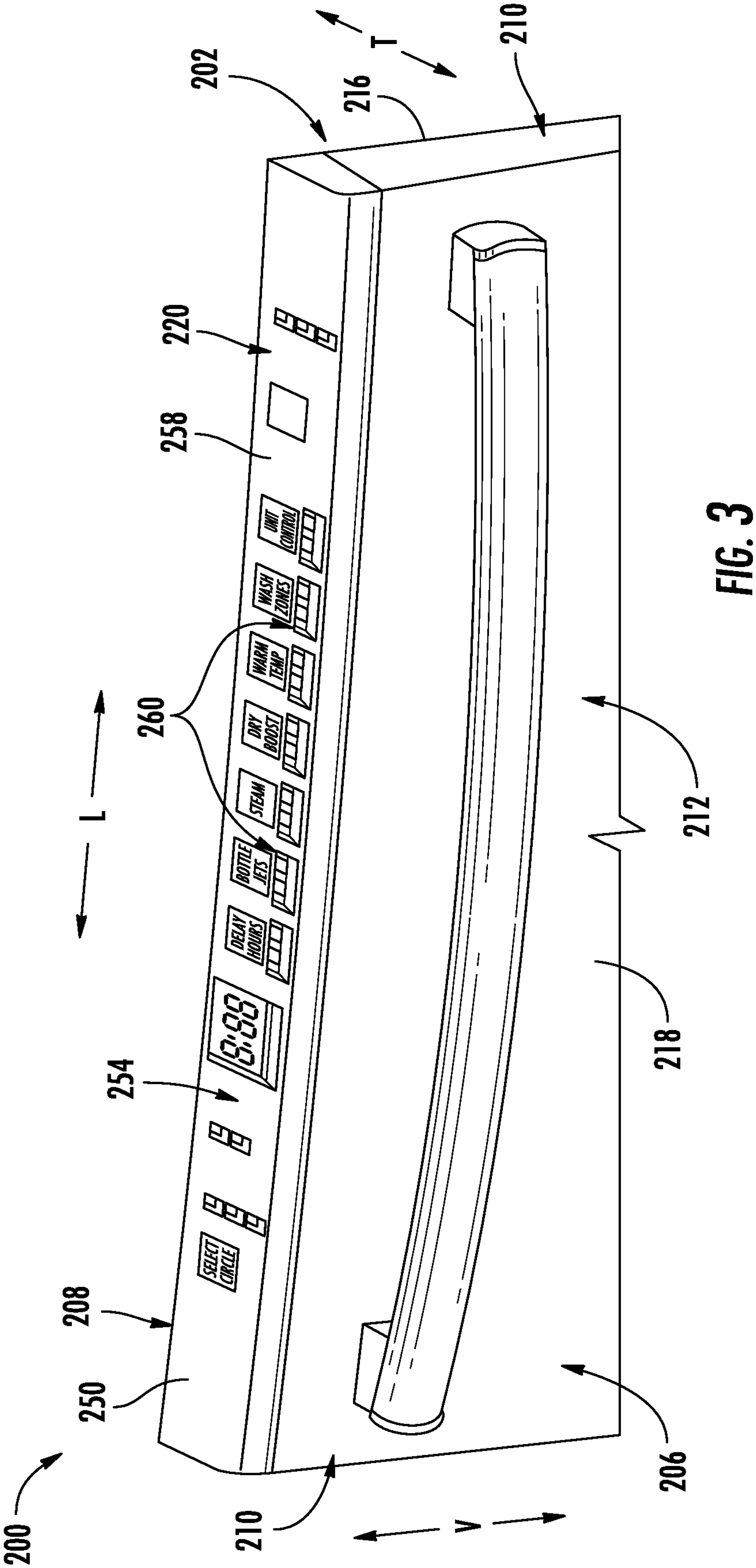
FIG. 3 provides a close-up perspective view of a control panel of the exemplary dishwasher door of FIG. 1 according to exemplary embodiments of the present disclosure.
Figure 4:
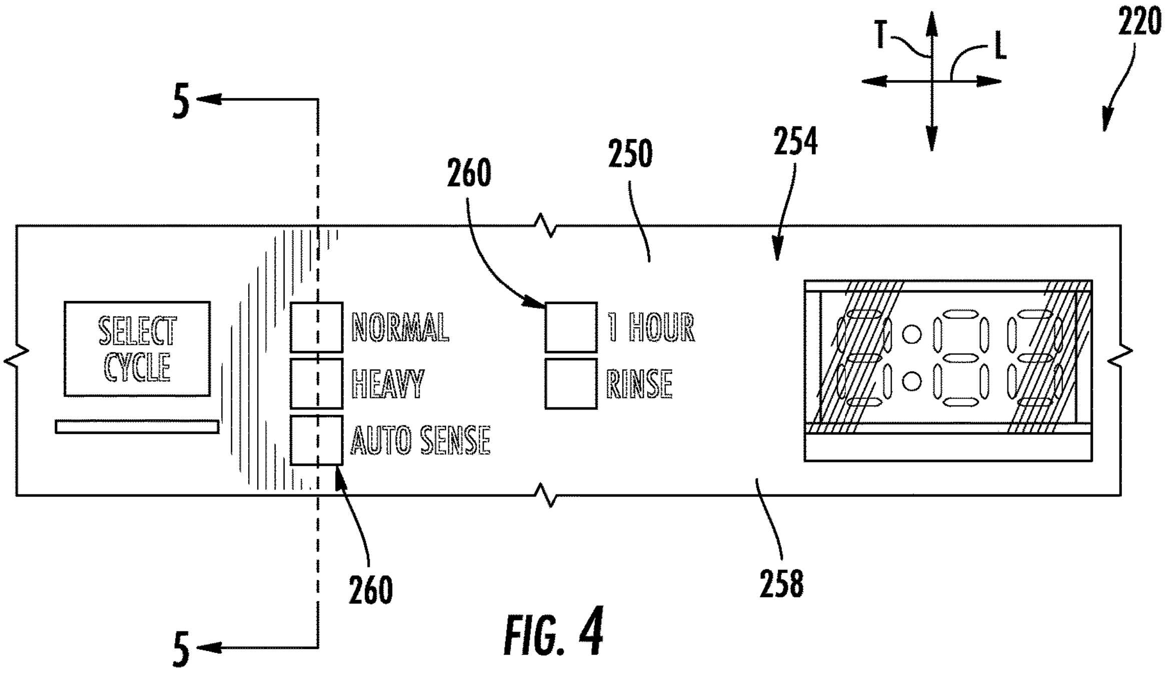
FIG. 4 provides a top perspective view of the exemplary control panel of FIG. 3 according to exemplary embodiments of the present disclosure.

As best illustrated in FIG. 3, door assembly 200 may include a door frame 212 that is formed from one or more exterior panels. In general, these exterior panels of door frame define an interior chamber 214 of door assembly 200. For example, door assembly 200 generally includes an inner door panel 216 and an outer door panel 218 which are spaced apart from each other along the transverse direction T to define a door gap or interior chamber 214 of door assembly 200 therebetween. For instance, outer door panel 218 may be positioned at or proximal to the front end 206 (i.e., distal to the rear end 208) and inner door panel 216 may be positioned at or proximal to the rear end 208 (i.e., distal to the front end 206).

According to exemplary embodiments, inner door panel 216 and outer door panel 218 may be panels that are stamped from stainless steel. Alternatively, inner door panel 216 and outer door panel 218 may be formed from any other suitably rigid material, such as thermoformed plastic, other metals, etc. In general, inner door panel 216 and outer door panel 218 may be assembled in any suitable manner. In addition, inner door panel 216 and outer door panel 218 may be secured together using any suitable mechanical fastener, welding, snap-fit mechanisms, etc. In addition, it should be appreciated that an insulating material (not shown), such as fiberglass or foam insulation, may be positioned within interior chamber 214 to provide thermal and/or sound insulation to dishwashing appliance 100.

As illustrated, door assembly 200 may generally include a control panel 220 that is mounted on door assembly 200 and is generally configured for facilitating user interaction with the dishwasher 100. In this regard, for example, control panel 220 (e.g., which may correspond to control panel 162 from FIG. 1) may be in direct operative communication with controller 160 of dishwasher 100, such that user inputs via control panel 220 may be directly used to regulate operation of various components of dishwasher 100.

According to the illustrated embodiment, control panel 220 may be positioned on top edge 202 door assembly 200 along the vertical direction V. Thus, e.g., control panel 220 may be partially hidden below a countertop when dishwasher appliance 100 is installed below the countertop and door 116 (e.g., door assembly 200) is closed. Accordingly, dishwasher appliance 100 may be referred to as a "top control dishwasher appliance." However, it should be appreciated that aspects of the present subject matter may be used with dishwasher appliances having other configurations or any other suitable appliance. For example, control panel 220 may be mounted on a front end 206 of door assembly 200 or may be mounted directly to an appliance cabinet or other suitable support structure for regulating the operation of any suitable appliance.

According to exemplary embodiments of the present subject matter, control panel 220 may generally define a display direction or illumination direction (e.g., identified generally by reference numeral 222). In general, illumination direction 222 may refer to the direction along which a user typically views control panel 220. For example, for a top control dishwasher appliance, the illumination direction 222 may generally extend normal to top edge 202 of door assembly 200. In other words, illumination direction 222 extends along the vertical direction V when door assembly 200 is in the closed position and along the transverse direction T when door assembly 200 is in the fully open position. By contrast, for front display dishwasher appliances, the illumination direction 222 may extend out a front end 206 door assembly 200. It should be appreciated that the directional orientations provided herein are only intended to facilitate discussion of aspects of the present subject matter, e.g., to describe the relative positioning of various components of control panel 220. However, it should be appreciated that these directional orientations may vary depending on the construction of the door assembly while remaining within the scope of the present subject matter.

Figure 5:
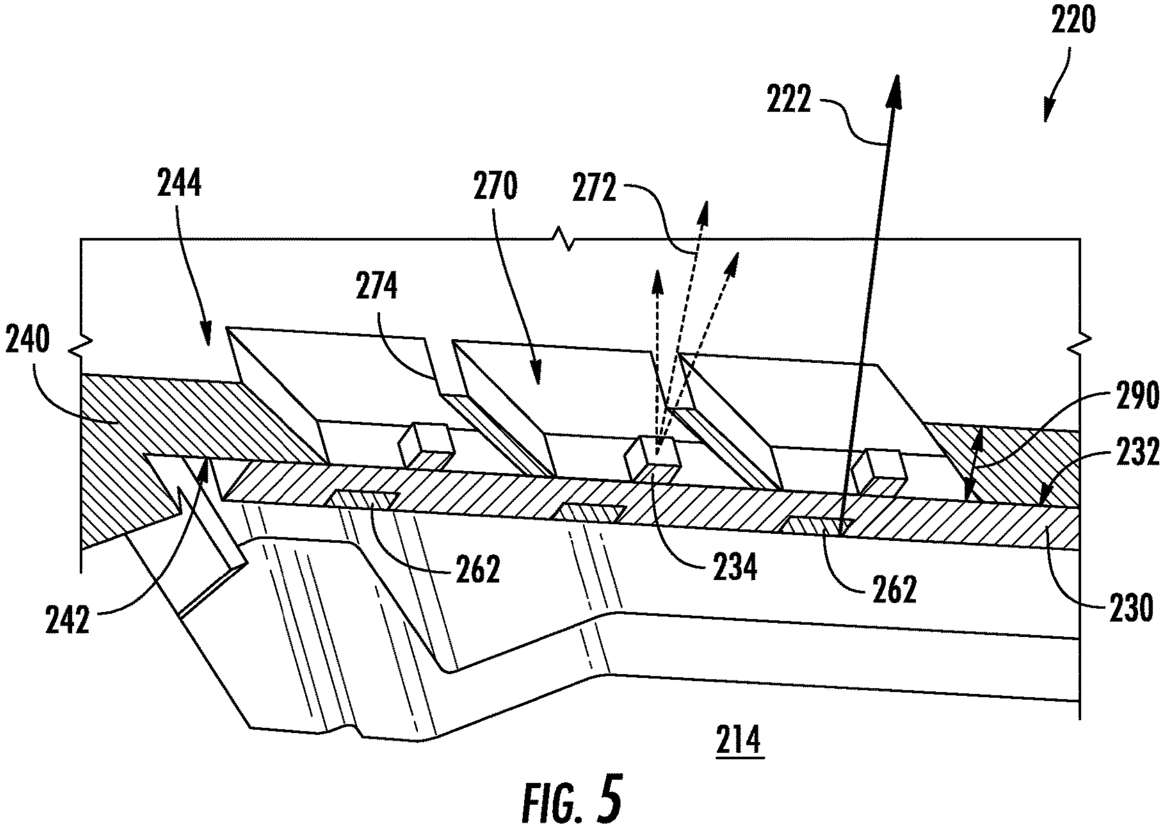
FIG. 5 provides a cross-sectional of the exemplary control panel of FIG. 3 taken along Line 5-5 of FIG. 4 according to exemplary embodiments of the present disclosure.
Figure 6:
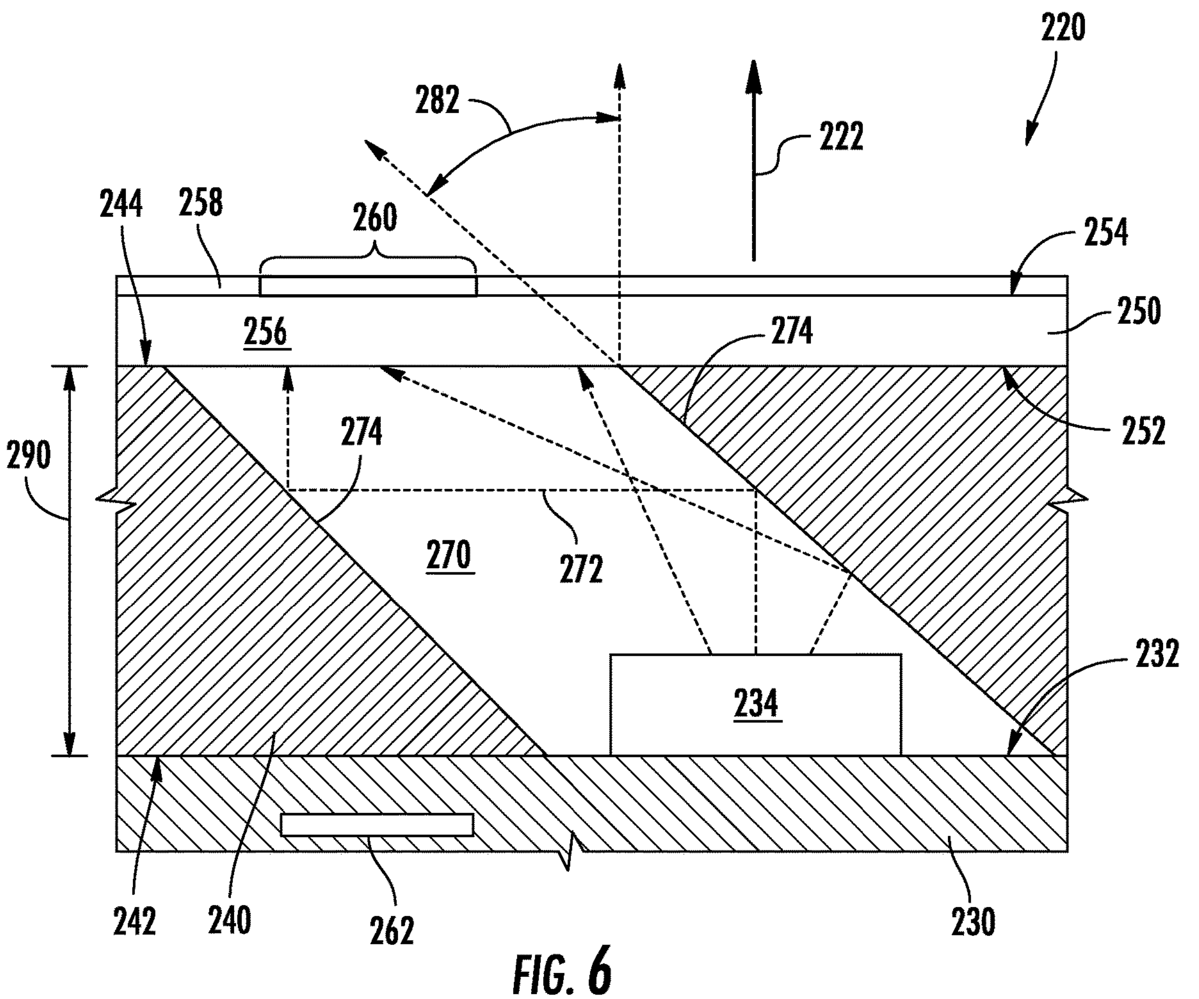
FIG. 6 provides a close-up cross-sectional side view of the exemplary control panel of FIG. 3 taken along Line 5-5 of FIG. 4 according to exemplary embodiments of the present disclosure.
Figure 7:
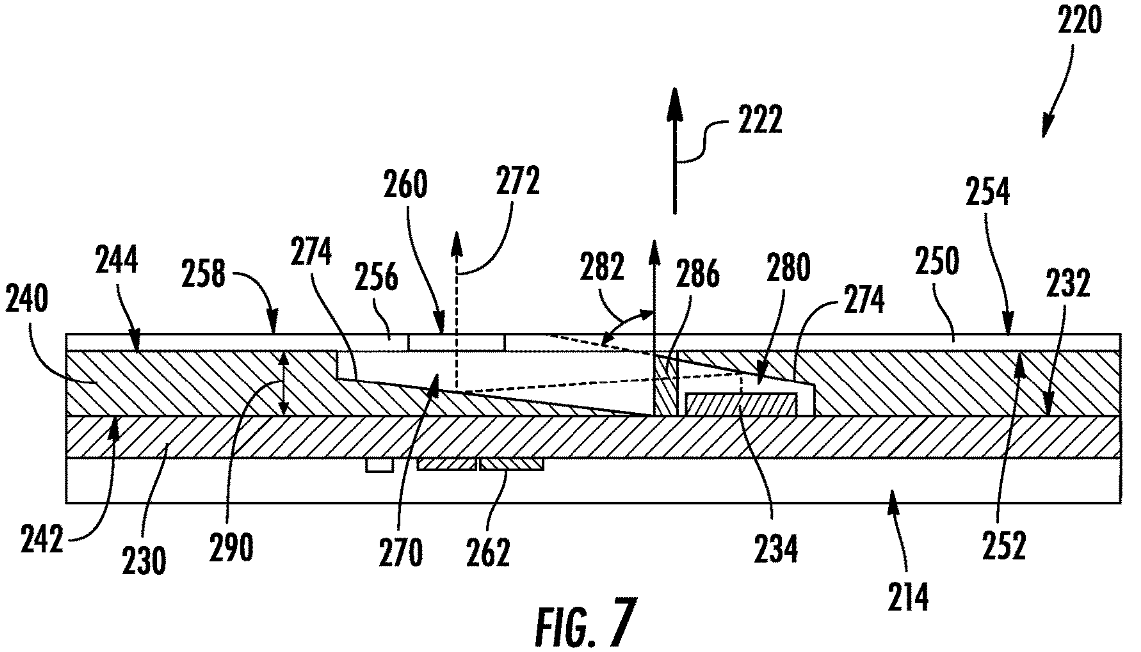
FIG. 7 provides a cross-sectional side view of an exemplary control panel according to another exemplary embodiment of the present disclosure.

Referring now specifically to FIGS. 5 through 7, control panel 220 may generally include a user interface board or printed circuit board 230 that may generally be configured for supporting controller 160 and various other control inputs or outputs of dishwasher appliance 100. More specifically, as understood by one of ordinary skill in the art, printed circuit board 230 may include or be operably coupled to one or more user inputs (e.g., user inputs 166) for receiving user input and/or to one or more displays or indicators (e.g., display components 168) for providing user notifications, e.g., by illuminating indicators to indicate cycles or operating status.

According to the illustrated embodiment, printed circuit board 230 generally extends along a horizontal plane (e.g., along the lateral direction L and the transverse direction T) within door assembly 200. More specifically, printed circuit board 230 may extend along the lateral direction L within door assembly 200, e.g., at least partially between lateral ends 210. In addition, printed circuit board 230 may generally extend along the transverse direction T between front end 206 and rear end 208 of door assembly 200. According to the illustrated embodiment, printed circuit board 230 generally defines a top surface 232 that extends within a horizontal plane when door assembly 200 is in the closed position.

According to the illustrated embodiment, door assembly 200 may further include a plurality of light sources 234 that are mounted to top surface 232 of printed circuit board 230 for selectively generating light. In this regard, light sources 234 may be configured for illuminating indicators, control inputs, or other features on control panel 220. These light sources 234 may include any suitable number, type, configuration, and orientation of light sources mounted at any suitable location to illuminate status indicators or buttons in any suitable colors, sizes, patterns, etc.

In other words, light sources 234 may be provided as any suitable number, type, position, and configuration of electrical light source(s), using any suitable light technology and illuminating in any suitable color. For example, according to the illustrated embodiment, light sources 234 may include one or more light emitting diodes (LEDs), which may each illuminate in a single color (e.g., white LEDs), or which may each illuminate in multiple colors (e.g., multi-color or RGB LEDs) depending on the control signal from controller 160.

However, it should be appreciated that according to alternative embodiments, light sources 234 may include any other suitable traditional light bulbs or sources, such as halogen bulbs, fluorescent bulbs, incandescent bulbs, glow bars, a fiber light source, etc. Moreover, light sources 234 may be operably coupled (e.g., electrically coupled) to printed circuit board 230, another suitable control board, and/or controller 160 (FIG. 2). Activation or illumination of light sources 234 may be generally controlled by a printed circuit board 230 or controller 160 (e.g., to indicate a user input, state of the dishwasher appliance, state of the wash cycle, or any other relevant information to a user).

According to exemplary embodiments, light sources 234 may include one or more vertically oriented light sources, referred to herein as top-fire light sources or light-emitting diodes (LEDs). In this regard, top-fire LEDs are generally configured for directing light primary along the vertical direction V when door assembly 200 is in the closed position (e.g., generating light 272 parallel to the illumination direction 222). In addition, or alternatively, light sources 234 may include one or more orthogonal light emitting devices, referred to herein as side-fire light sources or LEDs (e.g., generating light 272 perpendicular to the illumination direction 222). According to exemplary embodiments, side-fire LEDs are generally configured for directing a beam of light energy substantially within a horizontal plane (e.g., as identified by the transverse direction T and/or the lateral direction L).

As best illustrated in FIGS. 5 through 7, control panel 220 may generally include a control cover 240 that is mounted to printed circuit board 230. In this regard, for example, control cover 240 may be any suitable electrically insulated and opaque material that is mounted on top surface 234 of printed circuit board 230, e.g., to serve as a rigid support to facilitate user interaction with control panel 220. For example, according to the illustrated embodiment, control cover 240 may define a bottom surface 242 that is mounted in direct contact against top surface 232 of printed circuit board 230. In this regard, bottom surface 242 and top surface 232 may be substantially planar surfaces that extend along the horizontal direction when door assembly 200 is in the closed position. According to alternative embodiments, printed circuit board 230 could also be mounted with adhesive between the top surface of printed circuit board 230 and bottom surface 242 of control cover 240, may be spaced at a set distance, etc. In addition, control cover 240 may define a top surface 244 that is positioned opposite a bottom surface 242 along the illumination direction 222 (e.g., along the vertical direction V when door assembly 200 is in the closed position).

In addition, an overlay panel 250 may be mounted on top of control cover 240. More specifically, overlay panel 250 may include a bottom surface 252 that is seated directly against top surface 244 of control cover 240. In addition, overlay panel 250 may include a top surface 254 that is directly interacted with by a user of dishwasher appliance 100. In general, overlay panel 250 may be any suitable panel for dead fronting control panel 220 to a user of dishwasher appliance 100. As used herein, the term "dead front" and the like is generally intended to refer to portions of a control panel which may be used as indicators, buttons, interactive control surfaces, or other user-interaction features without exposing the user to the operating side of the equipment or live parts and connections, i.e., lights, electrical connections, etc. According to exemplary embodiments, overlay panel 250 may further include a diffusion layer that is printed or applied to bottom surface 252 of overlay panel 250 to help facilitate distribution of light 272.

For example, overlay panel 250 may include a transparent or translucent body 256 and an opaque masking material 258 that is selectively printed on top surface 254 (or bottom surface) of translucent body 256 to define one or more indicator zones 260 (e.g., corresponding to user inputs 166 or other indicators) and/or other illuminated features on control panel 220. In this regard, an opaque masking material 258 may be deposited on translucent body 256, may be applied using an adhesive, or may be applied in any other manner to define any suitable number, size, and configuration of illuminated features. These illuminated features may be shapes or include other forms such as symbols, words, etc. that are visible on control panel 220. More specifically, when light sources 234 are energized, indicator zones 260 that correspond to the user inputs 166 or other indicators may be illuminated. Thus, the dead fronted top surface 254 may be the surfaces that are contacted for controlling dishwasher appliance 100 or which may be illuminated for purposes of indicating operating status or other conditions to the user of the dishwasher appliance 100.

According to an exemplary embodiment, indicator zones 260 may correspond to user input buttons 166. In this regard, control panel 220 may include a plurality of capacitive sensors 262 which are mounted below selected indicator zones 260 and are operable to detect user inputs on overlay panel 150 of control panel 220. For example, a capacitive sensor 262 may be mounted to printed circuit board 230 and may be configured for triggering when a user touches a top surface 254 of overlay panel 250 proximate the capacitive sensor 262. In particular, capacitive sensors 262 can detect when a finger or another conductive material with a dielectric different than air contacts or approaches control panel 220.

When a user touches top surface 254 of overlay panel 250 adjacent one of capacitive sensors 262, such capacitive sensor 262 triggers and, e.g., signals a controller (e.g., controller 160). In such a manner, operations of dishwasher appliance 100 can be initiated and controlled. Capacitive sensors 262 may be distributed laterally on printed circuit board 230 below overlay panel 250. It will be understood that other any suitable number, type, and position of capacitive sensors 262 may be used while remaining within the scope of the present subject matter. Indeed, any suitable number, type, and configuration of touch buttons or user inputs 166 may be used while remaining within the scope of the present subject matter.

In general, control cover 240 and/or overlay panel 250 may be constructed from any suitably rigid material to facilitate operation of dishwasher appliance 100. For example, it should be appreciated that various features of control panel 220 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of control panel 220 may be formed from any other suitable rigid material.

Referring still specifically to FIGS. 5 through 7, control cover 240 may generally define a light directing channel 270 that generally extends from bottom surface 242 control cover 240 to top surface 244 of control cover 240. As illustrated, light source 234 may be positioned in light directing channel 270 proximate bottom surface 242 of control panel 240, e.g., on printed circuit board 230. In general, light directing channel 270 is configured for receiving light generated by the light source 234 (e.g., as identified herein generally by reference numeral 272) and directing light 272 through overlay panel 250 such that the light 272 is visible to a user of dishwasher appliance 100 (e.g., where opaque masking material 258 is not present at indicator zones 260). More specifically, light directing channel 270 may be used to increase the distance that light 272 needs to travel to reach overlay panel 250, e.g., such that light 272 has a better opportunity to diffuse, distribute, or otherwise spread to create a more uniform display, e.g., at indicator zones 260.

For example, in order to increase the distance that light 272 travels, light directing channel 270 may include one or more reflective surfaces 274 for redirecting light 272 within light directing channel 270. In this regard, light directing channel 270 and reflective surfaces 274 act to provide a tortuous path for light 272, e.g., to improve light distribution and uniformity. For example, according to the embodiment illustrated in FIG. 7, control cover 240 may define an offset chamber 280 that is offset relative to a respective one of the diffused indicator zones 260. In this regard, offset chamber 280 may be offset from indicator zone 260 relative to the illumination direction 222 and the light source 234 may be positioned within the offset chamber. In this manner, light source 234 may not be directly visible through indicator zone 260 when viewed along the illumination direction 222. In other words, a user viewing control panel 220 may not have direct line of sight with light source 234, e.g., but may instead see only diffused and redirected light passing through translucent body 256 and indicator zones 260.

Notably, according to exemplary embodiments, control panel 220 may generally have any suitable number, size, and configuration of reflective surfaces 274. For example, as illustrated in FIGS. 5 and 6, control panel 220 utilizes one primary reflective surface 274 that is positioned at least partially above light source 234 with some light 272 reflecting of a secondary reflective surface 274. By contrast, according to an alternative embodiment illustrated in FIG. 7, control panel 220 may include two light reflective surfaces 274 that act together to direct and diffuse light 272.

It should be appreciated that light reflective surfaces 274 may be formed in any suitable manner. In this regard, light reflective surfaces may be any feature that is configured to redirect at least a portion of light 272. For example, reflective surfaces 274 may simply be molded walls of control cover 240 that define light directing channel 270. According to still other embodiments, reflective surfaces 274 may include reflective films (not shown) that are deposited on control cover 240. In addition, the process of molding light directing channels 270 may leave a glossy finish that tends to reflect light, or a glossy finish may otherwise be imparted on the reflective surface 274 in any other suitable manner.

It should be appreciated that these reflective surfaces 274 may be angled relative to the direction of light 274 in order to most efficiently diffuse the light 272 prior to reaching overlay panel 250. For example, according to an exemplary embodiment, reflective surface 274 may define an angle 282 that is measured relative to the illumination direction 222. According to an exemplary embodiment, the angle 282 of reflective surface 274 is not parallel or perpendicular to the illumination direction 222. In this manner, light 272 does not have a tendency to be redirected back towards light source 234. It should be appreciated that angle 282 may vary while remaining within the scope of the present subject matter. For example, according to exemplary embodiments, angle 282 may be between about 5° and 80°, between about 10° and 60°, between about 20° and 45°, or about 30°.

Referring now specifically to FIG. 7, it should be appreciated that control panel 220 may include any other suitable features for properly diffusing, redirecting, or otherwise distributing light 272 within control panel 220. For example, according to the illustrated embodiment, control panel 220 may further include a diffusion member 286 that is positioned within light directing channel 270 between light source 234 and the diffused indicator zone 260. In general, diffusion member 286 may be any suitable transparent or semitransparent member configured for redirecting of light 272 passing therethrough.

As explained briefly above, control panel 220 may generally be configured for extending the length of the path that light 272 must travel to reach indicator zones 260. In this regard, as best illustrated for example in FIG. 7, control cover 240 or light directing channel 270 may generally define a light travel distance (e.g., the distance that light 272 travels from light source 234 to top surface 244 of control cover 240). In addition, control cover 240 may generally define a thickness 290 measured along the illumination direction 222 (e.g., along the vertical direction V). According to an exemplary embodiment, the light travel distance may be greater than two times thickness 290, greater than four times thickness 290, greater than five times thickness 290, or greater.

Notably, the limited space within door assembly 200 provides practical difficulties and in diffusing light 272 as it passes from light source 234 to indicator zones 260. For example, according to exemplary embodiments, thickness 290 of control cover 240 may be less than half an inch, less than 0.25 inches, less than 0.12 inches, or about 0.1 inches. Other suitable dimensions of control cover 240 are possible and within the scope present subject matter. Control cover 240 and light directing channel 270 may be designed to facilitate improved light diffusion within the limited thickness of control cover 240, e.g., while maintaining a compact assembly of control panel 220.

As explained above, aspects of the present subject matter are generally directed to a system and method to improve the visibility of control board indicator zones by improving diffusion of light to achieve larger diffused indicator zones within the tight confines of a control cover in an appliance door. The method may use a forward- or side-fire LEDs to reflect internally in the molded control cover to lengthen the distance between the light source and the indicator zone, thus improving diffusion, reducing LED count, and allowing LEDs to be placed remotely to the indictor zone. This may help in reducing board size and improving layouts while improving visibility of indicator zones and user satisfaction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control panel for an appliance, the control panel defining an illumination direction and comprising:

a printed circuit board defining a top surface;

a light source mounted to the top surface of the printed circuit board for selectively generating light;

a control cover mounted to the top surface of the printed circuit board over the light source, the control cover defining a light directing channel extending from a bottom surface of the control cover to a top surface of the control cover, wherein the light source is positioned in the light directing channel proximate the bottom surface of the control cover, and wherein the control cover further defines a reflective surface for redirecting the light generated by the light source toward the top surface of the control cover, wherein the reflective surface defines a reflection angle measured between a direction normal to and away from the reflective surface and the illumination direction, wherein the reflection angle is greater than 90 degrees; and an overlay panel mounted on the top surface of the control cover, the overlay panel comprising one or more diffused indicator zones.

2. The control panel of claim 1, wherein the control cover defines an offset chamber that is offset relative to the one or more diffused indicator zones relative to the illumination direction, wherein the light source is positioned within the offset chamber.

3. The control panel of claim 1, wherein the light source is not visible through the one or more diffused indicator zones when viewed along the illumination direction.

4. The control panel of claim 1, wherein the reflective surface defines an angle measured relative to the illumination direction that is not parallel or perpendicular to the illumination direction.

5. The control panel of claim 4, wherein the angle is between 10 degrees and 60 degrees.

6. The control panel of claim 1, wherein the control cover defines a plurality of reflective surfaces for redirecting the light generated by the light source.

7. The control panel of claim 1, wherein the reflective surface comprises a reflective film deposited on the control cover.

8. The control panel of claim 1, further comprising:

a diffusion member positioned within the light directing channel between the light source and the one or more diffused indicator zones.

9. The control panel of claim 1, wherein the control cover defines a light travel distance between the light source and the overlay panel, wherein the light travel distance is greater than 3 times a thickness of the control cover measured along the illumination direction.

10. The control panel of claim 1, wherein the control cover defines a thickness, the thickness being less than 0.25 inches.

11. The control panel of claim 10, wherein the thickness is less than 0.12 inches.

12. The control panel of claim 1, wherein the control cover is opaque.

13. The control panel of claim 1, wherein the one or more diffused indicator zones correspond to a plurality of user input buttons.

14. The control panel of claim 13, wherein the plurality of user input buttons comprise capacitive sensors mounted to the printed circuit board, the capacitive sensors being operable to detect user inputs via contact with the overlay panel.

15. The control panel of claim 1, wherein the overlay panel comprises:

a translucent body; and an opaque masking material deposited on the translucent body to define the one or more diffused indicator zones.

16. The control panel of claim 1, wherein the overlay panel comprises a diffusion layer on a bottom side of the overlay panel.

17. The control panel of claim 1, wherein the light source comprises a top-fire light-emitting diode mounted on the printed circuit board for generating the light parallel to the illumination direction.

18. The control panel of claim 1, wherein the light source comprises a side-fire light-emitting diode mounted on the printed circuit board for generating the light perpendicular to the illumination direction.

19. A dishwasher appliance defining a vertical direction, a lateral direction, and a transverse direction, the dishwasher appliance comprising:

a wash tub positioned within a cabinet and defining a wash chamber; and a door pivotally mounted to the cabinet to provide selective access to the wash chamber; and a control panel mounted on the door and defining an illumination direction, the control panel comprising:

a printed circuit board defining a top surface;

a light source mounted to the top surface of the printed circuit board for selectively generating light;

a control cover mounted to the top surface of the printed circuit board over the light source, the control cover defining a light directing channel extending from a bottom surface of the control cover to a top surface of the control cover, wherein the light source is positioned in the light directing channel proximate the bottom surface of the control cover, and wherein the control cover further defines a reflective surface for redirecting the light generated by the light source toward the top surface of the control cover, wherein the reflective surface defines a reflection angle measured between a direction normal to and away from the reflective surface and the illumination direction, wherein the reflection angle is greater than 90 degrees; and an overlay panel mounted on the top surface of the control cover, the overlay panel comprising one or more diffused indicator zones.

20. A control panel for an appliance, the control panel defining an illumination direction and comprising:

a printed circuit board defining a top surface;

a light source mounted to the top surface of the printed circuit board for selectively generating light;

a control cover mounted to the top surface of the printed circuit board over the light source, the control cover defining a light directing channel extending from a bottom surface of the control cover to a top surface of the control cover, wherein the light source is positioned in the light directing channel proximate the bottom surface of the control cover, and wherein the control cover further defines a reflective surface for redirecting the light generated by the light source toward the top surface of the control cover; and an overlay panel mounted on the top surface of the control cover, the overlay panel comprising one or more diffused indicator zones, wherein the light directing channel is inclined such that the light source is offset relative to the one or more diffused indicator zones relative to the illumination direction.

* * * * *